United States Patent
Tang et al.

(10) Patent No.: US 9,572,103 B2
(45) Date of Patent: Feb. 14, 2017

(54) SYSTEM AND METHOD FOR ADDRESSING DISCONTINUOUS TRANSMISSION IN A NETWORK DEVICE

(71) Applicant: Nuance Communications, Inc., Burlington, MA (US)

(72) Inventors: Qian-Yu Tang, Milpitas, CA (US); Victor Zeyliger, Redwood City, CA (US); Franck Bonard, Santa Clara, CA (US); Weiying Li, Cupertino, CA (US)

(73) Assignee: Nuance Communications, Inc., Burlington, MA (US)

( * ) Notice: Subject to any disclaimer, the term of this patent is extended or adjusted under 35 U.S.C. 154(b) by 117 days.

(21) Appl. No.: 14/495,421

(22) Filed: Sep. 24, 2014

(65) Prior Publication Data
US 2016/0086617 A1    Mar. 24, 2016

(51) Int. Cl.
| | | |
|---|---|---|
| *G10L 21/02* | (2013.01) | |
| *H04W 52/02* | (2009.01) | |
| *H04W 52/44* | (2009.01) | |
| *H04W 76/04* | (2009.01) | |
| *G10L 19/16* | (2013.01) | |
| *G10L 25/48* | (2013.01) | |
| *G10L 21/0208* | (2013.01) | |

(Continued)

(52) U.S. Cl.
CPC ......... *H04W 52/0209* (2013.01); *G10L 19/16* (2013.01); *G10L 25/48* (2013.01); *H04W 52/44* (2013.01); *H04W 76/048* (2013.01); *G10L 19/012* (2013.01); *G10L 21/0208* (2013.01); *G10L 2019/0002* (2013.01)

(58) Field of Classification Search
CPC .... G10L 19/005; G10L 19/012; G10L 19/173; G10L 19/12; G10L 19/24; G10L 25/78
USPC ........ 704/226, 219, 208, 214, 217, 221, 230
See application file for complete search history.

(56) References Cited

U.S. PATENT DOCUMENTS 7,873,513 B2 *   1/2011   Murgia ................. G10L 19/173
                                                                704/219
7,912,712 B2 *   3/2011   Shlomot ............... G10L 19/012
                                                                704/208

(Continued)

OTHER PUBLICATIONS

"AMR Speech Codec; Speech transcoding", 3rd Generation Partnership Project; Technical Specification Group Services and System Aspects; Mandatory Speech Codec speech processing functions; (Release 10); 3GPP TS 26.090, Mar. 2011.

(Continued)

*Primary Examiner* — Vijay B Chawan
(74) *Attorney, Agent, or Firm* — Mark H. Whittenberger, Esq.; Holland & Knight LLP

(57) ABSTRACT

Embodiments included herein are directed towards a system and method for addressing discontinuous transmission (DTX) in a network device. Embodiments may include receiving, at a computing device, an audio signal and generating at least one silence descriptor (SID) frame associated with the audio signal. Embodiments may also include generating at least one no data frame associated with the audio signal. Embodiments may also include initiating a speech decoder, voice enhancement, and speech encoder operation for the at least one SID frame during a DTX operation and bypassing the speech decoder, voice enhancement, and speech encoder functions for the at least one no data frame.

20 Claims, 7 Drawing Sheets

(51) Int. Cl.
G10L 19/00 (2013.01)
G10L 19/012 (2013.01)

(56) References Cited

U.S. PATENT DOCUMENTS

| | | | | |
|---|---|---|---|---|
| 8,370,135 B2* | 2/2013 | Shlomot | ............... | G10L 19/012 704/219 |
| 8,949,121 B2* | 2/2015 | Schandl | ............... | G10L 19/012 704/226 |
| 2009/0012784 A1* | 1/2009 | Murgia | ............... | G10L 19/173 704/230 |

OTHER PUBLICATIONS

"AMR Speech Codec; ANSI C source code", 3rd Generation Partnership Project; Technical Specification Group Services and System Aspects; 3GPP TS 26.073, Mar. 2011.
"AMR Speech Codec; Source controlled rate operation", 3rd Generation Partnership Project; Technical Specification Group Services and System Aspects; Mandatory speech codec speech processing functions, 3GPP TS 26.093, Mar. 2011.
"AMR Speech Codec; Voice Activity Detector", 3rd Generation Partnership Project; Technical Specification Group Services and System Aspects; Mandatory speech codec speech processing functions, 3GPP TS 26.094, Mar. 2011.
"AMR speech codec frame structure", 3rd Generation Partnership Project; Technical Specification Group Services and System Aspects; Mandatory speech codec speech processing functions; 3GPP TS 26.101, Mar. 2011.
"ANSI-C code for the floating-point AMR speech codec", 3rd Generation Partnership Project; Technical Specification Group Services and System Aspects; 3GPP TS 26.104, Sep. 2012.
"Half rate speech; Half rate speech transcoding", Digital cellular telecommunications system (Phase 2+); (GSM 06.20 version 8.0.1 Release 1999), 3GPP TS 06.20, Nov. 2000.
"AMR Speech Codec; Comfort noise aspects", 3rd Generation Partnership Project; Technical Specification Group Services and System Aspects; Mandatory speech codec speech processing functions, 3GPP TS 26.092, Mar. 2011.
"Half rate speech; ANSI-C code for the GSM half rate speech codec", Digital cellular telecommunications system (Phase 2+);(GSM 06.06 version 8.0.1 Release 1999), 3GPP TS 06.06, Nov. 2000.
"Coding of Speech at 8 kbit/s using conjugate-structure algebraic-code-excited linear prediction (CS-ACELP)", ITU G.729, Jan. 2007.
"RTP Payload Format and File Storage Format for the AMR and AMR-WB Audio Codecs", RFC 4867 Apr. 2007.
"Half rate speech; Discontinuous Transmission (DTX) for half rate speech traffic channels", Digital cellular telecommunications system (Phase 2+);(GSM 06.41 version 8.0.1 Release 1999), 3GPP TS 06.41, Nov. 2000.
"Half rate speech; Comfort noise aspects for the half rate speech traffic channels", Digital cellular telecommunications system (Phase 2+);(GSM 06.22 version 8.0.1 Release 1999), 3GPP TS 06.22, Nov. 2000.
"In-band control of remote transcoders and rate adaptors for half rate traffic channels", 3rd Generation Partnership Project; Technical Specification Group GSM/EDGE Radio Access Network; Digital cellular telecommunications system (Phase 2+);(Release 1999), 3GPP TS 08.61, Feb. 2002.
"Enhanced Full Rate (EFR) speech transcoding", Digital cellular telecommunications system (Phase 2+); (GSM 06.60 version 8.0.1 Release 1999), 3GPP TS 06.60, Nov. 2000.
"Comfort noise aspects for Enhanced Full Rate (EFR) speech traffic channels",Digital cellular telecommunications system (Phase 2+); (GSM 06.62 version 8.0.1 Release 1999), 3GPP TS 06.62, Nov. 2000.
"Discontinuous Transmission (DTX) for Enhanced Full Rate (EFR) speech traffic channels", Digital cellular telecommunications system (Phase 2+), (GSM 06.81 version 8.0.1 Release 1999), 3GPP TS 06.81, Nov. 2000.
"In-band control of remote transcoders and rate adaptors for Enhanced Full Rate (EFR) and full rate channels", 3rd Generation Partnership Project; Technical Specification Group GSM/EDGE Radio Access Network; Digital cellular telecommunications system (Phase 2+);(Release 1999), 3GPP TS 08.60, Jan. 2003.
"Full rate speech; Transcoding", 3rd Generation Partnership Project; Technical Specification Group Services and System Aspects; Digital cellular telecommunications system (Phase 2+);(Release 99), 3GPP TS 06.10, Jun. 2001.
"Comfort noise aspect for full rate speech traffic channels", 3rd Generation Partnership Project; Technical Specification Group Services and System Aspects; Digital cellular telecommunications system (Phase 2+); (Release 1999), 3GPP TS 06.12, Jun. 2001.
"Discontinuous Transmission (DTX) for full rate speech traffic channels", Digital cellular telecommunications system (Phase 2+); Full rate speech;(GSM 06.31 version 8.0.1 Release 1999), 3GPP TS 06.31, Nov. 2000.
"AMR-WB Speech Codec; Transcoding functions",3rd Generation Partnership Project; Technical Specification Group Services and System Aspects; Speech codec speech processing functions; 3GPP TS 26.190, Sep. 2012.
"AMR-WB Speech Codec; Frame structure", 3rd Generation Partnership Project; Technical Specification Group Services and System Aspects; Speech codec speech processing functions; 3GPP TS 26.201, Sep. 2012.
"AMR-WB Speech Codec; Comfort noise aspects"; 3rd Generation Partnership Project; Technical Specification Group Services and System Aspects; Speech codec speech processing functions; 3GPP TS 26.192, Sep. 2012.
"AMR-WB Speech Codec; Source controlled rate operation", 3rd Generation Partnership Project; Technical Specification Group Services and System Aspects; Speech codec speech processing functions; 3GPP TS 26.193; Sep. 2012.
"The E-model, a computational model for use in transmission planning", Series G: Transmission Systems and Media, Digital Systems and Networks, International telephone connections and circuits—General definitions, ITU-T G. 107, Mar. 2005.

* cited by examiner

200 receiving, at a computing device, an audio signal

202 generating at least one silence descriptor (SID) frame associated with the audio signal

204 generating at least one no data frame associated with the audio signal

206 initiating a speech decoder, voice enhancement, and speech encoder operation for the at least one SID frame during a DTX operation

208 bypassing the speech decoder, voice enhancement, and speech encoder functions for the at least one no data frame

SYSTEM AND METHOD FOR ADDRESSING DISCONTINUOUS TRANSMISSION IN A NETWORK DEVICE

TECHNICAL FIELD

This disclosure relates to communications systems and, more particularly, to a system and method for discontinuous transmission ("DTX") operation in a network device in order to increase system capacity with voice enhancement.

BACKGROUND

Discontinuous transmission (DTX) may refer to a method of momentarily powering-down, or muting, a mobile or portable wireless telephone set when there is no voice input to the set. In a typical two-way conversation, each individual speaks slightly less than half of the time. If the transmitter signal is switched on only during periods of voice input, the duty cycle of the telephone set can be cut to less than 50 percent. This conserves battery power, eases the workload of the components in the transmitter devices, and frees the voice channel so that time-division multiplexing ("TDM") and code-division multiplexing access ("CDMA") networks can take advantage of the available bandwidth by sharing the channel with other signals. On the receiver side, the speech decoder generates comfort noise matching the background noise during DTX to avoid annoying effect of "total silence" when the transmission is switched off.

Among others, it has been established that the DTX operation in wireless networks such as GSM networks and CDMA networks provides a number of advantages, some of which may include, but are not limited to, saving power and battery usage in the user equipment and reducing the overall interference and load in the networks. This optimizes the overall efficiency of a wireless voice communication system. The downlink DTX improves the overall carrier to interference ("C/I") levels in the network, which results in better spectrum utilization and increased capacity.

SUMMARY OF DISCLOSURE

In one implementation, a computer-implemented method for addressing discontinuous transmission (DTX) in a network device is provided. Embodiments may include receiving, at a computing device, an audio signal and generating at least one silence descriptor (SID) frame associated with the audio signal. Embodiments may also include generating at least one no data frame associated with the audio signal. Embodiments may also include initiating a speech decoder, voice enhancement, and speech encoder operation for the at least one SID frame during a DTX operation and bypassing the speech decoder, voice enhancement, and speech encoder functions for the at least one no data frame.

One or more of the following features may be included. In some embodiments, the method may include relaying a plurality of bits from a decoder associated with the network device to an adaptive encoder. The method may further include relaying a receiver (RX) frame type from the decoder to a transmission (TX) frame type in the adaptive encoder. The method may also include calculating a logarithmic frame energy based upon, at least in part, a current SID frame. The method may further include updating a history memory buffer associated with the logarithmic frame energy using the current SID frame. The method may also include calculating an averaged logarithmic frame energy using the updated history memory buffer. The method may further include defining a decoder voice activity detection (VAD) flag based upon, at least in part, a codec mode rate and saving the VAD_flag in an adaptive encoder memory. The method may also include calculating a decoder excitation for the at least one SID frame based upon, at least in part, a fixed codebook input without including an adaptive codebook input. The method may further include saving original encoded LP coefficients and LSP parameters in an adaptive encoder memory associated with the network device. The method may include copying the at least one SID frame from an RTP packet in the decoder to the output of the adaptive encoder. The method may also include saving an adaptive encoder excitation to an encoder excitation to achieve excitation synchronization. The method may further include generating a new SID frame using one or more LPC parameters available in an adaptive encoder memory.

In another implementation, a system configured to addressing discontinuous transmission (DTX) in a network device is provided. The system may include a processor configured to perform one or more operations. Operations may include receiving, at a computing device, an audio signal and generating at least one silence descriptor (SID) frame associated with the audio signal. Embodiments may also include generating at least one no data frame associated with the audio signal. Embodiments may also include initiating a speech decoder, voice enhancement, and speech encoder operation for the at least one SID frame during a DTX operation and bypassing the speech decoder, voice enhancement, and speech encoder functions for the at least one no data frame.

One or more of the following features may be included. In some embodiments, the operations may include relaying a plurality of bits from a decoder associated with the network device to an adaptive encoder. Operations may further include relaying a receiver (RX) frame type from the decoder to a transmission (TX) frame type in the adaptive encoder. Operations may also include calculating a logarithmic frame energy based upon, at least in part, a current SID frame. Operations may further include updating a history memory buffer associated with the logarithmic frame energy using the current SID frame Operations may also include calculating an averaged logarithmic frame energy using the updated history memory buffer. The method may further include defining a decoder voice activity detection (VAD) flag based upon, at least in part, a codec mode rate and saving the VAD flag in an adaptive encoder memory. Operations may also include calculating a decoder excitation for the at least one SID frame based upon, at least in part, a fixed codebook input without including an adaptive codebook input. Operations may further include saving original encoded LP coefficients and LSP parameters in an adaptive encoder memory associated with the network device. Operations may include copying the at least one SID frame from an RTP packet in the decoder to the output of the adaptive encoder. Operations may also include saving an adaptive encoder excitation to an encoder excitation to achieve excitation synchronization. Operations may further include generating a new SID frame using one or more LPC parameters available in an adaptive encoder memory.

The details of one or more implementations are set forth in the accompanying drawings and the description below. Other features and advantages will become apparent from the description, the drawings, and the claims.

BRIEF DESCRIPTION OF THE DRAWINGS

FIG. 2 is a flowchart of a DTX process in accordance with an embodiment of the present disclosure;

Like reference symbols in the various drawings may indicate like elements.

DETAILED DESCRIPTION

Embodiments provided herein are directed towards a system and method for addressing DTX issues in a network device. Accordingly, some embodiments relate generally to wireless and Voice over Internet Protocol (VoIP) applications in fields that may include, but are not limited to, telephony, data networking, telecommunications, cellular systems, smart phones, and mobile devices. The embodiments included herein may allow for DTX operation in a network device in order to increase system capacity with voice enhancement.

Embodiments included herein may be used in accordance with an Ethernet Voice Processor ("EVP") as is discussed in further detail hereinbelow. With traditional DTX operation in a voice enhancement device ("VED"), a speech decoder may generate 160 ms of comfort noise and voice quality assurance (VQA) algorithms, and the speech encoder may process 160 ms of comfort noise. Embodiments of the present disclosure may ignore certain data frames during DTX to increase system capacity. Accordingly, in some embodiments, the system may process only 20 ms of comfort noise during the same 160 ms DTX period. As such, the overall CPU usage in term of MIPS may be conserved and the system capacity in terms of number of voice channels simultaneously supported by the EVP system may be increased. By way of example, if 50% of the packets in a call are DTX frames, then the overall EVP system capacity may be doubled. Accordingly, embodiments of the present disclosure may be used to increase the EVP system capacity.

Figure 1:
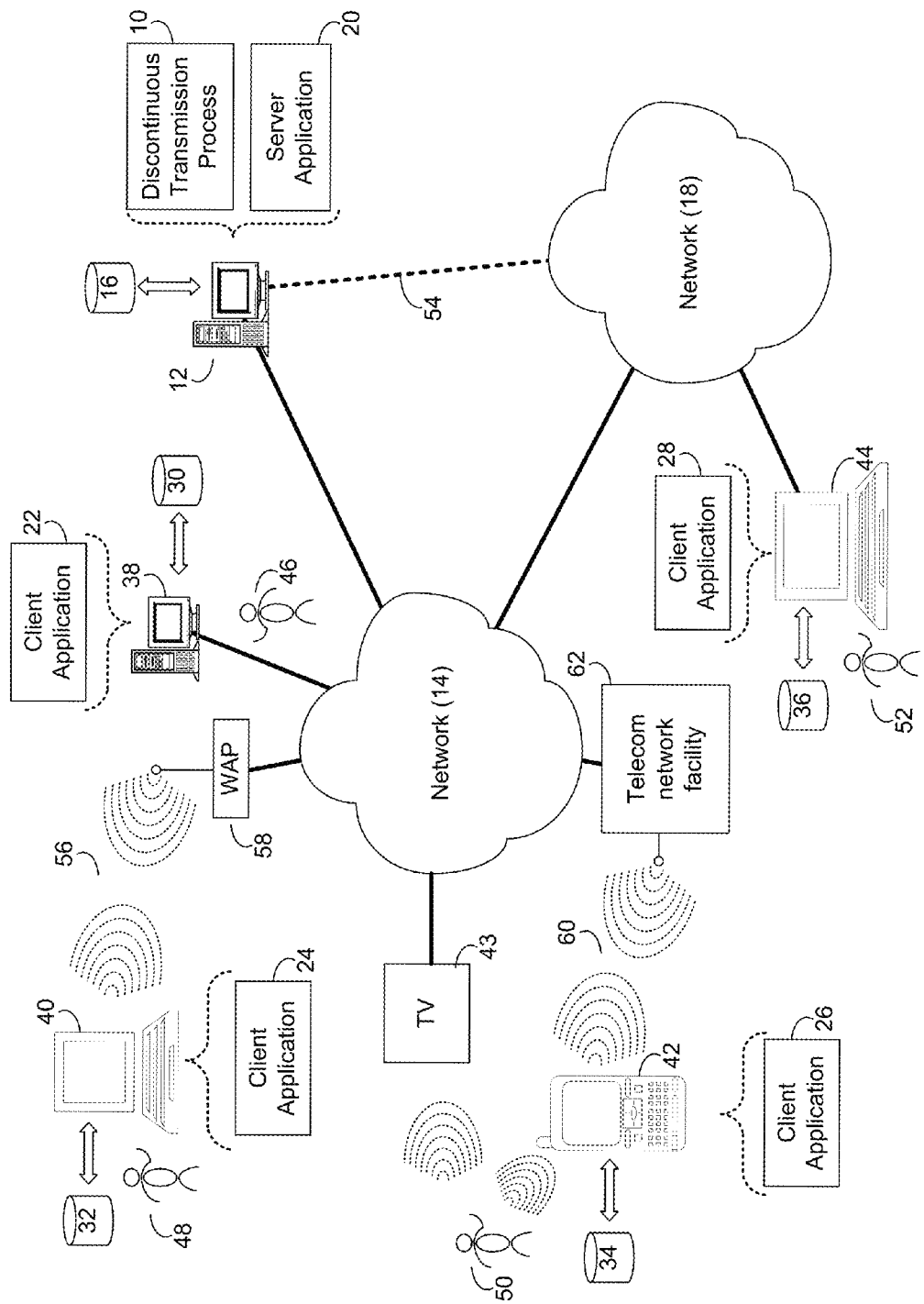
FIG. 1 is a diagrammatic view of a DTX process in accordance with an embodiment of the present disclosure.

Referring to FIG. 1, there is shown a DTX process 10 that may reside on and may be executed by computer 12, which may be connected to network 14 (e.g., the Internet or a local area network). Server application 20 may include some or all of the elements of DTX process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-7, DTX process 10 may include receiving (202), at a computing device, an audio signal and generating (204) at least one silence descriptor (SID) frame associated with the audio signal. Embodiments may also include generating (206) at least one no data frame associated with the audio signal. Embodiments may also include initiating (208) a speech decoder, voice enhancement, and speech encoder operation for the at least one SID frame during a DTX operation and bypassing (210) the speech decoder, voice enhancement, and speech encoder functions for the at least one no data frame.

The instruction sets and subroutines of DTX process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, DTX process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of DTX process 10. Accordingly, DTX process 10 may be a purely server-side application, a purely client-side application, or a hybrid server-side/client-side application that is cooperatively executed by one or more of client applications 22, 24, 26, 28 and DTX process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and DTX process 10 directly through network 14 or through secondary network 18. Further, computer 12 may be connected to network 14 through secondary network 18, as illustrated with phantom link line 54. In some embodiments, users may access DTX process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

In some embodiments, some or all of the devices shown in FIG. 1 may be or may include encoders, decoders, or any combination thereof. The term "codec" as used herein may refer to a device or computer program capable of encoding and/or decoding a digital data stream or signal.

Figure 3:
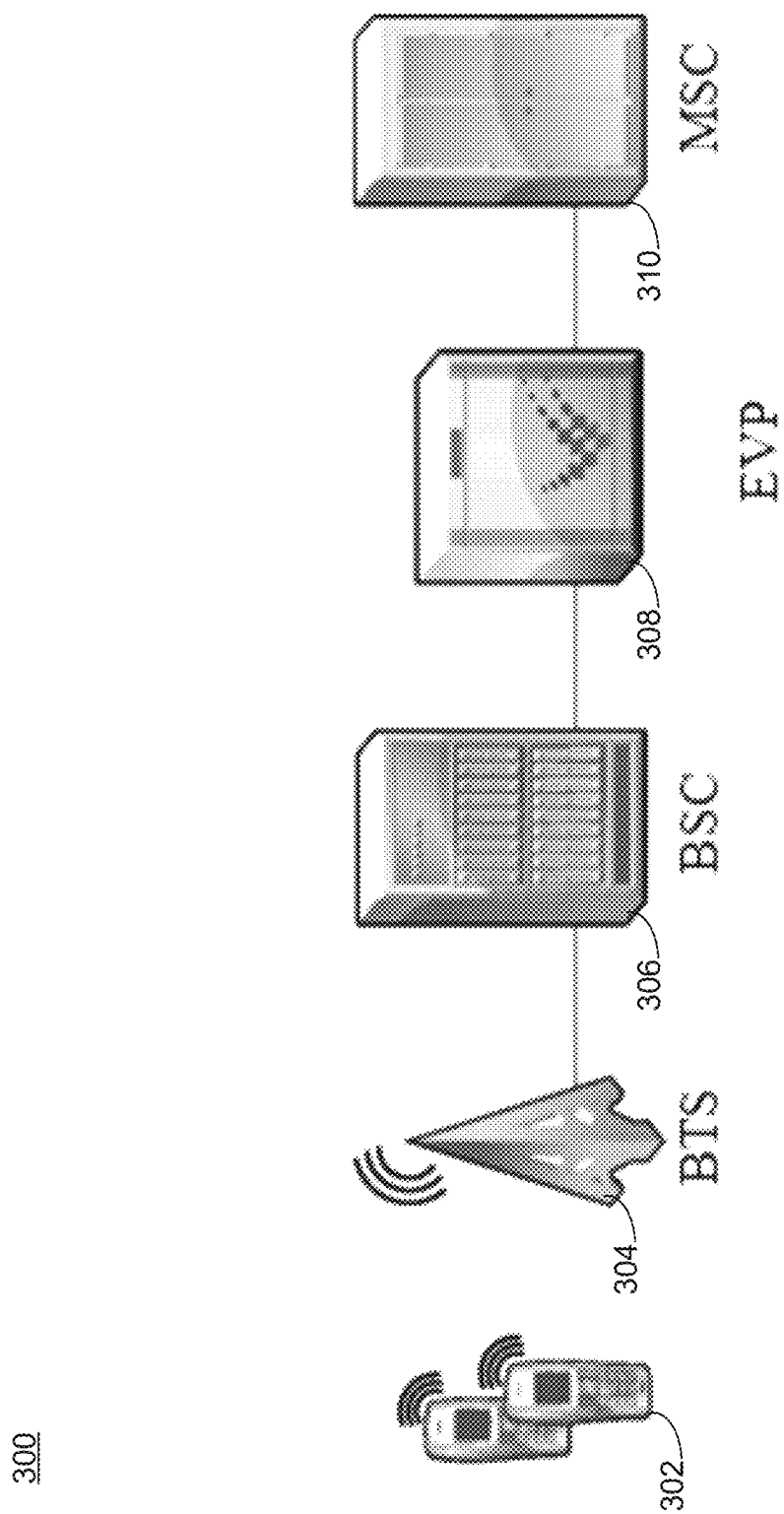
FIG. 3 is a diagrammatic view of an embodiment of a DTX process consistent with embodiments of the present disclosure.

Referring now to FIG. 3, and as discussed above, embodiments of DTX process 10 may be used in accordance with an Ethernet Voice Processor (EVP). FIG. 3 depicts a wireless device 302, base transceiver station 304, base station controller (BSC) 306, EVP 308 and mobile switching center 310. FIG. 3 shows how a VED solution may be deployed at the A-interface of GSM networks. A voice enhancement device (VED) may be located at a central office, for example, within network equipment, such as the A-interface between MSC 310 and BSC 306 in a GSM wireless network.

Figure 4:
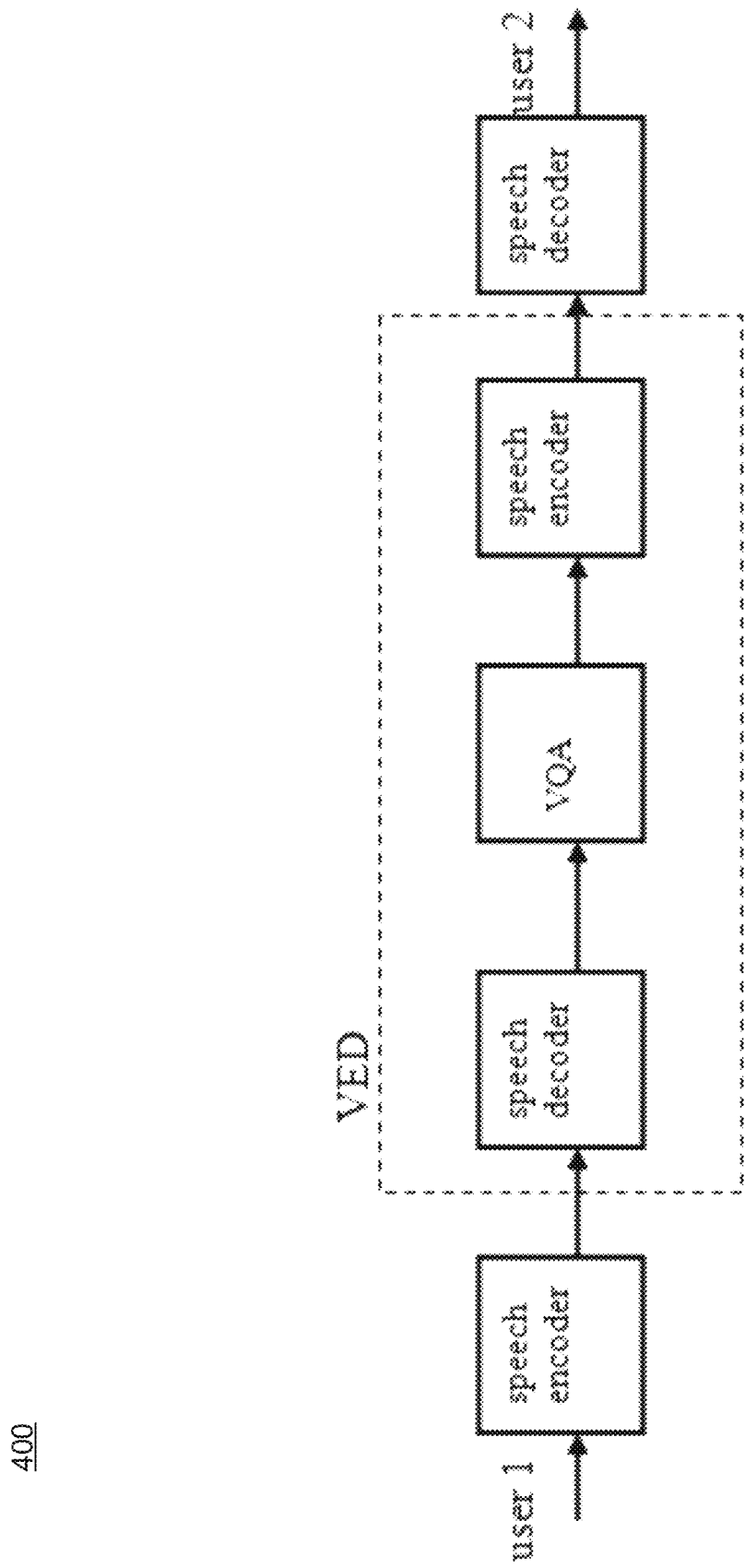
FIG. 4 is a diagrammatic view of an embodiment of a DTX process consistent with embodiments of the present disclosure.
Figure 5:
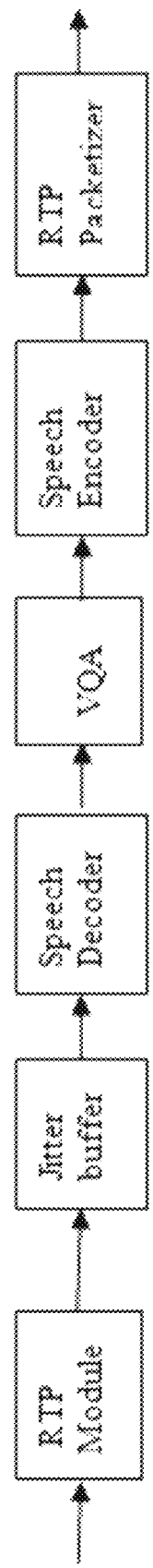
FIG. 5 is a diagrammatic view of an embodiment of a DTX process consistent with embodiments of the present disclosure.

In some embodiments, the voice enhancement algorithms may be referred to as voice quality assurance (VQA). FIG. 4 provides a diagram depicting VED with VQA capability. The encoded bit stream from a first user may be sent to a network device with VQA capability for voice enhancement. Some VQA algorithms may include, but are not limited to, adaptive noise reduction (ANR), acoustic echo cancellation (AEC), hybrid echo cancellation (HEC), adaptive level control (ALC), and enhanced voice intelligence (EVI) modules. The VQA algorithms may operate on the decoded speech. After the impairments such as noise and echo are removed, the speech may be encoded again. Then the encoded bit stream is sent to a second user for decoding. The other direction works similarly where the encoded speech from a second user may be sent to VED for voice enhancement and the re-encoded speech may be sent back to the first user for decoding.

Existing DTX methods focus on performing efficient DTX operation on the end device, i.e., on the radio transmitter and receiver. A voice activity detector (VAD) may be needed for DTX operation, which tells whether the input signal in the current frame contains speech or not under complicated background noise environments. Embodiments of the present disclosure include a method and apparatus for new DTX operation in a network device to increase system capacity in terms of number of voice channels simultaneously supported by an EVP system.

As discussed above, in wireless communications, discontinuous transmission (DTX) happens because mobile users talk about 40%-50% of the time and are silent for the remainder. During a typical DTX period in a voice enhancement device (VED), the speech decoder may generate 160 ms comfort noise; the voice quality assurance (VQA) algorithms and the speech encoder may process 160 ms comfort noise. Embodiments of the present disclosure may be used to increase system capacity of VED. This may be achieved using a variety of techniques, for example, by not processing the 140 ms comfort noise corresponding to DTX no data frames, and, when the DTX silence descriptor (SID) frame does show up, by relaying the state machine status bit and the in-band signaling bits. Without processing the 140 ms of data frames during DTX, embodiments of the present disclosure may provide an approach for VQA timing synchronization.

Embodiments of DTX process 10 are directed towards DTX operation in a network device with voice enhancement. Some examples discussed herein are in the context of an Adaptive Multi-Rate (AMR) coder. However, it should be noted that the teachings of the present disclosure are not limited to such an example and may be implemented using various coders, some of which may include, but are not limited to, G.729, AMR, and GSM-HR coders. Additionally and/or alternatively, embodiments of DTX process 10 may apply to any or all speech coders used in GSM and CDMA networks some of which may include, but are not limited to, GSM enhanced full rate (EFR), GSM full rate (FR), GSM-HR, AMR, AMR wideband (AMR-WB), and enhanced variable rate codec (EVRC).

Referring now to Table 1, an embodiment depicting DTX operation and the SID frame format for an AMR coder is provided. An AMR coder may have a 20 ms frame time and eight mode rates: 4.75 kbps, 5.15 kbps, 5.9 kbps, 6.7 kbps, 7.4 kbps, 7.95 kbps, 10.2 kbps, and 12.2 kbps. A voice activity detector (VAD) may be used in the AMR encoder to detect whether the input signal contains speech or not. The output of the VAD function per 20 ms codec frame is a binary flag called VAD_flag, where VAD_flag=1 indicates a speech frame and VAD_flag=0 indicates a noise frame. The DTX operation in the encoder may be controlled by the TX DTX handler. Table 1 illustrates the principle of the TX DTX hander to generate silence descriptor (SID) frames.

TABLE 1

| Diagram on TX DTX Handler | | | | | | | |
|---|---|---|---|---|---|---|---|
| Frame | | | | | | | |
| | n − 2 | n − 1 | n | n + 1 | n + 2 | n + 3 | n + 4 |
| Vad_flag | 1 | 1 | 0 | 0 | 0 | 0 | 0 |
| Output | SP | SP | SP | SP | SP | SP | SP |
| | n + 5 | n + 6 | n + 7 | n + 8 | n + 9 | n + 10 | n + 11 |
| Vad_flag | 0 | 0 | 0 | 0 | 0 | 0 | 0 |
| Output | SP | SP | FI | ND | ND | UP | ND |

"SP" = SPEECH,
"FI" = SID_FIRST,
"ND" = NO DATA,
"UP" = SID_UPDATE

At the end of a speech burst, i.e., frame (n−1) in Table 1, there is a hangover period of seven frames where the TX DTX handler generates speech frames even though the VAD_flag=0. The $1^{st}$ SID frame, called SID_FIRST is generated at the frame (n+7) after the hangover period. After the SID_FIRST frame, the 1st SID_UPDATE frame is generated as the third frame at frame (n+10). Other SID_UP- DATE frames may be generated every 8$^{th}$ frame. There is one exceptional scenario where less than 24 frames have elapsed at the end of the speech burst since the last SID_UPDATE frame was computed. In this case the last SID_UPDATE frame may be used. The hangover time may be the same at the initial time of the TX DTX handler. During the NO DATA period, the speech decoder on the RX side generates comfort noise using the latest available SID parameters.

An AMR SID frame may include 39 bits, where the first 35 bits are linear prediction coefficient (LPC) parameters, using an equivalent line spectral frequency (LSF) representation, as illustrated in Table 2 shown below. The 1$^{st}$ three bits are the index for the un-quantized mean LSF vector over the past eight frames given as follows:

$$f^{mean}(i) = \frac{1}{8} \sum_{n=0}^{7} f(i-n)$$

where f(i) is the un-quantized LSF parameter vector of the current frame with the form $f^T=[f_1\ f_2 \ldots f_{10}]$ since 10-order infinite impulse response (IIR) filter is used for the speech synthesis (M=10). The next 26 bits from s4-s29 in Table 2 are the LSF parameters. The averaged logarithmic frame energy over the past eight frames may be quantized using 6 bits from s30-s35. The SID type indicator (STI) bit indicates SID_FIRST and SID_UPDATE if STI=0 and STI=1 respectively. The last three bits is the mode indication of the current frame with least significant bit (LSB) first.

TABLE 2

SID Frame Format for AMR Coder

| bits | description |
| --- | --- |
| s1-s3 | index of reference vector |
| s4-s11 | index of 1$^{st}$ LSF sub-vector |
| s12-s20 | index of 2$^{nd}$ LSF sub-vector |
| s21-s29 | index of 3$^{rd}$ LSF sub-vector |
| s30-s35 | index of logarithmic frame energy |
| s36 | SID type indicator (STI) |
| s37-s39 | mode indication (MI) |

For VoIP applications, the real-time transport protocol (RTP) provides end-to-end delivery services for data with real-time characteristics. Every RTP packet may include a fixed length RTP header, followed by RTP payload. For AMR, the RTP payload structure is shown in the following Table 3.

TABLE 3

RTP Payload Format for AMR

| Payload header | Table of contents (TOC) | Speech data |
| --- | --- | --- |

For both bandwidth-efficient (BE) and octet-aligned (OA) modes, the payload header has a 3-bit field called codec mode request (CMR), and the TOC has a 6-bit field as shown in Table 4.

TABLE 4

Important TOC Bit Fields for AMR

| F (1-bit) | FT (4-bit) | Q (1-bit) |
| --- | --- | --- |

In Table 4, the F bit indicates whether this frame is followed by another speech frame, FT is the frame type (FT) index, and the Q bit is the frame quality indicator where Q=1 and Q=0 means that the current frame is good and bad respectively. When FT is in the range between [0, 7], FT means the AMR mode rate used in the encoded bit stream. When FT=8 and FT=15, the frame is an AMR SID frame and no data frame, respectively.

The principle of the DTX operation for other speech coders in GSM networks is similar to Table 1 for AMR. AMR-WB may include an identical timing procedure as that for AMR, e.g., one SID_UPDATE frame may be generated in every 8$^{th}$ frame. For GSM-HR, one SID frame may be generated in every 240 ms. In the case of GSM EFR and GSM FR, one SID frame is generated in every 24 frames, corresponding to 480 ms background noise.

In terms of SID frame format, AMR-WB SID frame may be similar to AMR, except it has 40 bits since the mode indication has four bits in order to represent 9 mode rates for AMR-WB. For GSM-HR, the SID codeword with 79 bits of all "1" at the end of each frame is used for SID identification. In the case of GSM EFR, the SID codeword may be defined by 95 bits of all "1" based on a table. For GSM FR, the SID codeword uses 95 bits of all zero for SID identification.

Embodiments of DTX process 10 may include an EVP that may provide Voice Quality Assurance (VQA), Experience Intelligence (EXi), trans-coding, RTP packet processing, jitter buffer (JB) for network impairments, etc. An example of the VED model is provided in FIG. 5. As shown in the figure, an RTP module may be used to validate the incoming packets in a typical VOIP application. The JB module provides algorithms to deal with network impairments such as jitter, delay, packet loss, packet re-order, packet duplicates, etc. After speech encoder, the speech frames are assembled in the RTP packetizer module.

Figure 6:
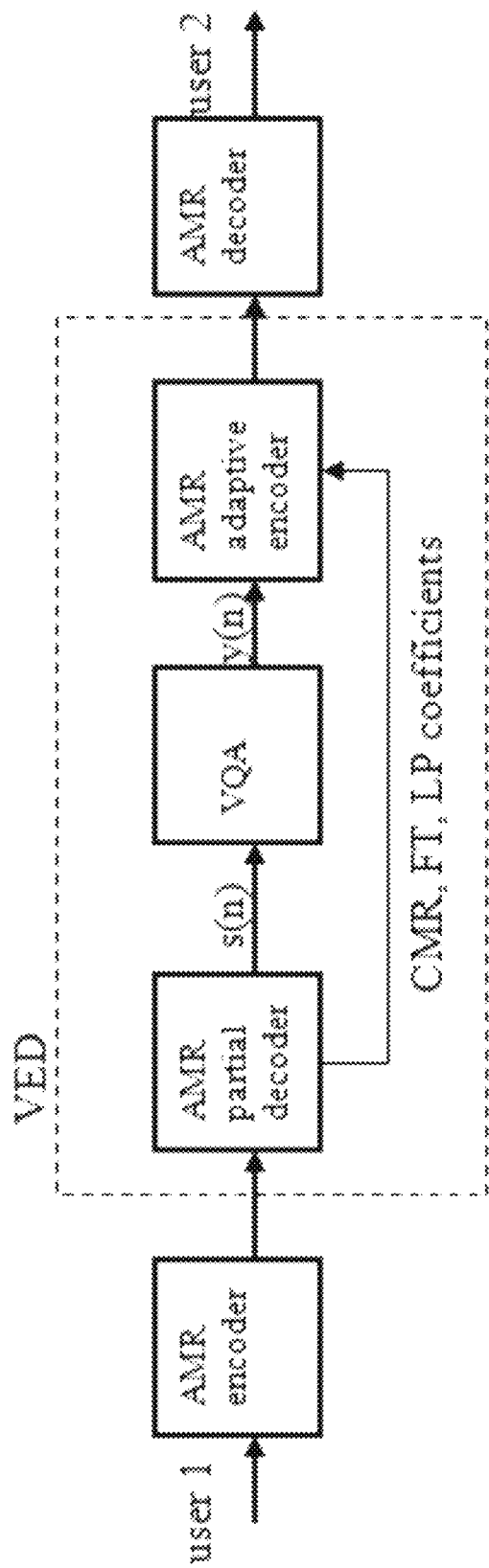
FIG. 6 is a diagrammatic view of an embodiment of a DTX process consistent with embodiments of the present disclosure.

Referring back to FIG. 4, the speech decoder in the VED may be referred to as a partial decoder. The speech encoder in the VED may be referred to as an adaptive encoder. FIG. 6 depicts an embodiment when both users are using an AMR coder. When other speech coders, such as a G.729 coder and GSM-HR coder, are used, similar diagrams can be obtained. In FIG. 6, CMR, FT, and the decoder parameters LP filter coefficients may be copied from the decoder input to the adaptive encoder output, to avoid codec tandeming.

Based on FIG. 6 and Table 1, during AMR DTX operation, the DTX timing procedure in a traditional VED is specified in Table 5. As shown in Table 5, the AMR decoder, VQA module, and AMR encoder may be called for all speech frames from the n-th frame to the (n+7)-th frame. From frame (n+1) to frame (n+7), the JB provides the no data frame information to the speech decoder. Then the speech decoder may generate comfort noise. The VQA algorithms may be applied to process the impairments such as echo and noise. The output signal may be encoded using AMR encoder. Then, the encoder bit stream is sent out using RTP packet format.

TABLE 5

Table on Traditional DTX Operation for VED

| | Frame | | | | | | | | |
|---|---|---|---|---|---|---|---|---|---|
| | n | n + 1 | n + 2 | n + 3 | n + 4 | n + 5 | n + 6 | n + 7 | n + 8 |
| SID Frame | UP | ND | ND | ND | ND | ND | ND | ND | UP |
| DTX operation | UP | ND | ND | ND | ND | ND | ND | ND | UP |
| Speech codec | Yes | Yes | Yes | Yes | Yes | Yes | Yes | Yes | Yes |
| VQA | Yes | Yes | Yes | Yes | Yes | Yes | Yes | Yes | Yes |

"ND" = NO DATA,
"UP" = SID_UPDATE

An example of an EVP DTX operation timing procedure can be specified in Table 6.

TABLE 6

Table on EVP DTX Operation

| | Frame | | | | | | | | |
|---|---|---|---|---|---|---|---|---|---|
| | n | n + 1 | n + 2 | n + 3 | n + 4 | n + 5 | n + 6 | n + 7 | n + 8 |
| SID Frame | UP | | | Not available | | | | | UP |
| DTX operation | UP | | | Not available | | | | | UP |
| Speech codec | Yes | | | Not available | | | | | Yes |
| VQA | Yes | | | Not available | | | | | Yes |

"ND" = NO DATA,
"UP" = SID_UPDATE

In comparison with traditional DTX operation for voice enhancement device (VED), embodiments of DTX process 10 completely ignore the no data frames. The speech decoder, VQA algorithms, and the speech encoder may not be called at all during the period of no data frames.

With traditional DTX operation in VED, the speech decoder generates 160 ms comfort noise; the speech decoder, VQA algorithms, and the speech encoder are called eight times from the n-th frame to the (n+7)-th frame. In some embodiments, the speech decoder generates 20 ms comfort noise; the speech decoder, VQA algorithms, and the speech encoder are called only one time in the new EVP system during the same 160 ms DTX operation period. Thus, the overall CPU usage in term of MIPS is saved; the system capacity in terms of number of voice channels simultaneously supported by EVP system is increased. If 50% of packets in a call are DTX frames, then the overall EVP system capacity is almost doubled.

Let us describe the new DTX timing procedure in FIG. 6 without running the consecutive no data frames as shown in Table 6. The 39 bits of AMR SID frame may be divided into three parts: one STI bit, three MI bits, and 35 bits for comfort noise. The STI bit contains state machine information in remote AMR encoder of user 1, which cannot be recovered, since only 20 ms samples are available and other 140 ms NO DATA samples are unavailable in our EVP system. The three MI bits contain DTX in-band signaling information; they indicate the codec mode rate that would have been used if the current frame had been a speech frame instead of SID frame. The VED system in EVP is unable to generate its own MI bits.

Embodiments of DTX process 10 may relay the last four bits completely. The system capacity may be increased by taking advantage of the NO DATA frames; meanwhile the RX DTX operation of remote user 2 in FIG. 6 is unaffected.

For example, suppose that pAdaptive is a pointer to the defined adaptive encoder memory. A variable pAdaptive→sid_para in the adaptive encoder memory may be used to save the last four bits of a SID frame. When an SID frame is received, the speech decoder obtains the last four bits and save them in pAdaptive→sid_para. Since FT is relayed as shown in FIG. 6, an SID frame may be generated from the speech encoder in VED. At the time when a new SID frame is synthesized, pAdaptive→sid_para is used as the last four bits, leading to STI and MI bits relay for the SID frame.

An example describing a frame type relay in the EVP system is provided below. The RX frame type may be defined in the data structure RXFrameType. After receiving the RTP packet, the Q bit in Table 4 may be used to determine if the current frame is a bad frame, given by a variable bfi, where bfi=1 indicates a bad frame and bfi=0 indicates a good frame. The RX frame type may be determined using the following procedure.

In some embodiments, if bfi equals 1, the AMR mode information from the FT field in Table 4 may be used to determine whether the current frame type is a bad speech frame or bad SID frame (i.e., RX_SPEECH_BAD or RX_SID_BAD), unless it is a no data frame in which case the frame type may be defined as RX_NO_DATA. If the current frame is a good frame where bfi=0, the STI bit in Table 2 may be used to determine the RX frame type: STI=0 indicates RX_SID_FIRST and STI=1 indicates RX_SID_UPDATE. If no mode information is available, the mode information from the previous frame may be used and the current RX frame type may be changed from RX_SPEECH_BAD to RX_SID_BAD if previous frame type is bigger or equals to RX_SID_FIRST. Finally, the RX frame type may be saved to the adaptive encoder memory pAdaptive→dec_frameType.

In some embodiments, the TX frame type may have a defined data structure TXFrameType. After the AMR encoder is called, the encoded bit stream from the AMR encoder may be generated by the actual used mode. If the used mode is MRDTX (=8), then define TX frame type as TX_SID_FIRST, TX_SID_UPDATE, TX_NO_DATA, TX_SPEECH_BAD, and TX_SID_BAD if pAdaptive→dec_frameType equals to RX_SID_FIRST, RX_SID_UPDATE, RX_NO_DATA, RX_SPEECH_BAD, and RX_SID_BAD, respectively. If the used mode is in the range between 0 and 7, then define TX frame type as TX_SPEECH_GOOD.

In some embodiments, for the AMR encoder to generate a SID frame, the averaged logarithmic energy may be calculated. The logarithmic frame energy may be computed for each frame by the following formula:

$$en_{log}(i) = \frac{1}{2}\log_2\left(\frac{1}{N}\sum_{n=0}^{N-1} y^2(n)\right),$$ Equation (1)

where y(n) is the encoder input signal of the current frame i as shown in FIG. 6. The averaged logarithmic energy may be computed by $$en_{log}^{mean}(i) = \frac{1}{8}\sum_{n=0}^{7} en_{log}(i-n)$$ Equation (2)

for frame i, and is further quantized using 6 bits s30-s35 as shown in Table 2.

The calculation of the averaged logarithmic energy in a SID frame requires eight consecutive noise frames. For EVP DTX operation, the other seven no data frames, corresponding to seven consecutive noise frames, are not available. Thus the averaging operation may not finish. Embodiments of the present disclosure may determine the averaged logarithmic energy using the following DTX memory synchronization approach.

Suppose that log_en is the averaged logarithmic energy obtained from Equation (1) using this SID frame. The DTX encoder state has an array log_en_hist[ ] with maximum size eight to represent the history of the averaged logarithmic energy. When the used mode rate in the AMR encoder is MRDTX (=8), corresponding to a SID frame in the AMR decoder in FIG. 6, an update of the history memory of the logarithmic energy just using this frame may be performed as the previous seven no data frames are not available. This may involve assigning log_en to the eight elements in the buffer buffer log_en_hist[ ]. Accordingly, the history memory of the averaged logarithmic energy due to DTX operation without no data frames is synchronized, and the SID frame with correct comfort noise energy level can be generated using Equation (2).

In some embodiments, a voice activity detector (VAD) is running in the AMR encoder to generate a binary flag indicating whether the input signal contains speech or not, where 1 indicates speech and 0 indicates noise. Such a voicing flag may be used to drive the TX DTX timing procedure as shown in Table 1. In this section, an example showing a methodology for deriving a new decoder VAD flag to drive the TX DTX operation without running the VAD function is provided.

In the AMR decoder, a new VAD flag may be defined, which may be referred to as vadFlagDecoder. If the AMR mode rate, derived from the FT bit field from RTP payload as seen in Table 4, is in the range between MRDTX (=8) and 15, then define vadFlagDecoder=0. Otherwise if it is in the range between 0 and 7, define vadFlagDecoder=1.

In some embodiments, the VAD function in the AMR encoder may be disabled to save CPU MIPS usage and improve the system capacity. The output vad_flag from the VAD function may be defined as the new decoder VAD_flag vadFlagDecoder. The TX DTX handler may also be disabled. The used mode in the encoder may be used to decide whether we need generate a SID frame or not. A flag compute_sid_flag may be used to indicate whether it is necessary to generate an SID frame. If the used mode is MRDTX (=8), set the flag compute_sid_flag=1 so that a SID frame is always generated whenever the DTX encoder function is called.

In some embodiments, some VQA algorithms may include, but are not limited to, fast Fourier transform (FFT), voice activity detector (VAD), adaptive noise reduction (ANR), acoustic echo cancellation (AEC), hybrid echo cancellation (HEC), adaptive level control (ALC), and enhanced voice intelligence (EVI) modules, and packet loss concealment (PLC) modules, where AEC, HEC, and PLC modules may need to measure the timing changes from the incoming RTP packets, in particular, during DTX operation period.

In some embodiments, DTX process 10 may include one or more Experience Intelligence (EXi) modules. The EXi may include a non-intrusive voice monitoring tool that may include network impairment to estimate the voice quality in term of mean-opinion-score (MOS), based on ITU G.107 E Model. EXi module may be designed to understand the characteristics of VoIP and the impact of IP network impairments on voice quality. The EXi module may generate call quality metrics, including listening quality (LQ) and conversational quality (CQ) MOS scores. The basic rating factor R in the E-model is given by:

$$R = R_o - I_s - I_d - I_{e\text{-}eff} + A \qquad \text{Equation (3)}$$

where $R_o$ is the basic signal-to-noise (SNR) ratio, $I_s$ is the combination of all impairments with the voice transmission, $I_d$ is the impairments caused by delay, $I_{e\text{-}eff}$ is the effective impairments caused by low bit rate codecs, and A is the advantage factor. The input to the E-model may include one or more of the following: signal level, noise level, SNR, real-time packet loss impairment, and the echo related parameters including delay and echo path loss. It may be necessary to provide the above metrics when the DTX operation occurs. The output of the E-model may include R factors and MOS scores for LQ and CQ. Without running VQA functions during the period of no data frames, it may be necessary to compensate the speech and noise power level. Otherwise, the EXi scores may not be accurate.

Suppose that chP is a pointer to the defined channel memory with channel state data structure. When a RTP packet arrives at EVP system, the RTP timestamp as a 32-bit unsigned integer may be saved in a local variable curr_timestamp. The channel state memory chP→preValidTS may be used to save the timestamp value, and may be initialized to zero when the channel memory is initialized. In case that chP→preValidTS=0, set chP→preValidTS as the current timestamp value. Otherwise, the timestamp jump tsSkips in term of AMR codec frame time 20 ms is determined as follows. First, calculate the difference between curr_timestamp and previous saved timestamp chP→preValidTS. Then, divide the difference by 160 and then minus one to obtain the timestamp jump tsSkips in terms of AMR codec frame time 20 ms, where 160 is the expected timestamp change for consecutive arriving packets. Since RTP timestamp is a 32-bit integer, wrapping around situation need be taken into account. After that, curr_timestamp value is saved to chP→preValidTS.

Suppose the VQA input signal is s(n) and the output signal is y(n) as shown in FIG. 6. To measure the speech and noise power, a voice activity detector (VAD) function in the VQA module is called to detect whether the input signal s(n) contains speech or not. The output is a flag called VadFlag where VadFlag=0 and 1 mean noise and speech respectively. The input frame power is calculated by $$P_{in} = \frac{1}{N} \sum_{n=1}^{N} s(n)^2 \qquad \text{Equation (4)}$$

Similarly, the output power $P_{out}$ is obtained.

If tsSkips=0 (i.e., there is no timestamp jump) then call the measurement process function PWRMEA_process( ) for the input power $P_{in}$ and the output power $P_{out}$ to calculate the average speech and noise power based on the VAD flag VadFlag. Suppose that pState is a pointer to the defined power measurement state memory with a state data structure. Then, at the end of the function PWRMEA_process( ), the input power and VadFlag are saved in the state variables pState→pre_framePwr pState→pre_VadFlag respectively.

If tsSkips>0 (i.e., there is a timestamp jump) then DTX process 10 may use the previous saved power and VadFlag to repeat the power measurement process (tsSkips) times.

Then, call the measurement process function PWRMEA_process( ) using the new input power $P_{in}$ and the output power $P_{out}$ to calculate the average speech and noise power based on the new VAD flag VadFlag. Thus, the power measurement process may be called (tsSkips+1) times with different power measurements and VAD flags. At the end of the function PWRMEA_process( ) the latest power measurement and VadFlag may be saved in pState→pre_framePwr and pState→pre_VadFlag respectively. The above process may be repeated for both input signal s(n) and the output signal y(n).

In some embodiments, the AEC module may use the following formula to calculate reference signal energy:

$$\bar{P}=(1-\alpha)\bar{P}+\alpha y^2(n) \qquad \text{Equation (5)}$$

where $\alpha=\frac{1}{64}$ and $\alpha=\frac{1}{512}$ for short term and long term reference signal energy calculation respectively.

If the timestamp jump tsSkips=0 (i.e., there is no timestamp jump) then DTX process 10 may update the reference signal power once for the AEC operation on the other direction. There are two steps involving the reference signal power updating, one step in the time-domain and another step in the frequency-domain. Suppose that chPrev is a pointer to the defined channel memory on the other direction of the call with data structure PCM_CHAN_STATE, and hAec is a pointer to the defined AEC state memory on the other direction of the call with data structure AEC_STATE.

In this example, in the time-domain, the three buffers hAec→lLongWinRefEnr[ ], hAec→lShortWinRefEnr[ ], and hAec→nRefVad[ ], representing the long term reference signal energy, short term reference signal energy, and the VAD flag respectively, are shifted to the right one position. Then, hAec→lLongWinRefEnr[0], hAec→lShortWinRefEnr[0], and hAec→nRefVad[0] may be updated with latest long term reference signal energy, latest short term reference signal energy, and the latest VAD flag respectively.

In the frequency domain, the dB value of the latest signal energy based on each critical band is stored in an array EdB[ ] with array size 18 since there are 18 critical bands. Then, the EdB[ ] array may be copied to hAec→nRefEnr [nIdx0][ ], where nIdx0 is the current index position. Meanwhile, the EdB[ ] array may be saved in the array hAec→preRefEdb[ ] for the next frame.

If tsSkips>0 (i.e., there is a timestamp jump) then in the time domain, DTX process 10 may update the three buffers hAec→lLongWinRefEnr[ ], hAec→lShortWinRefEnr[ ], and hAec→nRefVad[ ] as many as (tsSkips) times using previous available measurements. In the frequency domain, previous saved power level in dB value in the buffer hAec→preRefEdb[ ] may be used to update the buffer hAec→nRefEnr[nIdx0][ ] as many as (tsSkips) times, where the index nIdx0 keeps decreasing until reaching zero, in which case it will be set to the maximal value (BULKDELAY_FRM_MAX+1), where BULKDELAY_FRM_MAX represents the maximal frame number for the buffer. After that, the procedure may be repeated as the case where tsSkips=0 using latest signal and EdB[ ] buffer. The AEC timing may be synchronized by the above procedure during the DTX operation where the no data frames are not processed.

In some embodiments, DTX process 10 may include excitation synchronization between an AMR encoder and an AMR adaptive encoder for DTX operations. With regard to decoder excitation during DTX, suppose that pAdaptive is a pointer to the defined adaptive encoder memory with data structure ADAP_ENC_STATE. If the received frame is an AMR SID frame, the interpolated linear prediction coefficient (LPC) parameters A[ ] with array size 44 and the decoded line spectral pair (LSP) parameters may be saved in the adaptive encoder memory pAdaptive→A[ ] and pAdaptive→lsp[ ] respectively. The total excitation before the synthesis filter in the decoder is given by:

$$u(n)=\hat{g}_c c(n) \qquad \text{Equation (6)}$$

where u(n) is the total excitation, c(n) is the fixed codebook vector, and $\hat{g}_c$ is the quantized fixed codebook gain respectively. The total decoder excitation u(n) before the synthesis filter is denoted by e2(n) with 160 samples for current SID frame. The speech synthesis filter is provided below:

$$H_f(z) = \frac{1}{\hat{A}(z)}, \hat{A}(z) = 1 + \sum_{i=1}^{M} \hat{a}_i z^{-i}, M = 10 \qquad \text{Equation (7)}$$

where $\hat{a}_i$, $1 \le i \le 10$ are the quantized LPCs. The comfort noise s(n) may be synthesized by filtering the reconstructed excitation signal u(n) through the LP synthesis filter using the speech synthesis model. At the end of the decoder function, the total excitation u(n) per codec frame may be saved in the adaptive encoder memory pAdaptive→dec_curr_exc[ ].

Referring again to FIG. 6, the output signal after VQA module is denoted by y(n). In this example, let pEncState be a pointer to the defined encoder state memory and pEncState→old_exc[ ] be the encoder excitation buffer. The new excitation e1(n) associated with the output signal y(n) is obtained by passing y(n) through the analyser filter Â(z) as defined below:

$$e1(n) = s(n) + \sum_{i=1}^{M} \hat{a}_i s(n-i) \qquad \text{Equation (8)}$$

where $\hat{\alpha}_i$, $1 \le i \le M$ are the interpolated Â(z) coefficients for each sub-frame with 40 samples.

DTX process 10 may compare the distance D between e1(n) and previous e2(n). If the distance D is very small, then the original SID frame from the RTP packet in the decoder is copied to the output of the AMR encoder. The adaptive encoder excitation e2(n) may be saved to the encoder excitation buffer pEncState→old_exc[ ] for current frame to achieve excitation synchronization. This is a result of the fact that the next frame may be a speech frame and it may be necessary to re-encode it. In that example, the adaptive codebook generation for the next frame may need the excitation vector in the current SID frame. If the distance D is too large it may be necessary to use the DTX encoder to generate a new SID frame using LPC parameters available in the adaptive encoder memory pAdaptive→A[ ] and pAdaptive→lsp[ ].

As discussed above, in some embodiments, the EVP system may process one SID frame; the seven other data frames may be completely ignored. The last four bits of the 39-bit AMR SID frame may be particularly useful. The SID type indicator (STI) bit may include state machine status in a remote AMR encoder. In some embodiments, the VED system may not be able to recover the state machine since the 140 ms consecutive comfort noise samples, corresponding to seven no data frames, may be unavailable. The three mode indication (MI) bits may include DTX in-band signaling information. The EVP system may leave them untouched. In some embodiments, DTX process 10 may be configured to relay the last four bits completely.

After the decoded speech signal is processed by VQA (e.g., using adaptive noise cancellation (ANC)) the remaining 35 bits in a SID frame, including six bits for the averaged logarithmic frame energy may be handled as discussed below. The first 29 bits of the AMR SID frame, which may belong to an equivalent line spectral frequency (LSF) representation of the linear prediction coefficients (LPC), may be relayed. The calculation of the averaged logarithmic energy in an SID frame requires eight consecutive noise frames. For EVP DTX operation, the other seven data frames, corresponding to seven consecutive noise frames, may be unavailable. Accordingly, the averaging operation using eight consecutive noise frames cannot be finished. Embodiments of DTX process 10 may use DTX memory synchronization to solve this problem. First, DTX process 10 may calculate the logarithmic energy belonging to this SID frame using 160 samples. DTX process 10 may also assign the logarithmic energy to the eight elements in the history buffer. In this way, the history memory of the averaged logarithmic energy due to DTX operation without data frames may be synchronized and the SID frame with correct comfort noise energy level can be generated.

In some embodiments, a voice activity detector (VAD) may be running in the AMR encoder to generate a binary flag indicating whether the input signal contains speech or not, where, in this example, "1" indicates speech and "0" indicates noise. Such a voicing flag may be used to drive the TX DTX timing procedure. Embodiments of DTX process 10 may derive a new decoder VAD flag to drive the TX DTX operation without running the VAD function. The VAD function in the original AMR encoder may be disabled to save CPU MIPS usage and further improve the system capacity.

Embodiments of DTX process 10 may provide VQA timing synchronization during DTX. Without processing the 140 ms of consecutive comfort noise samples by VQA functions during the seven no data frames, when the AMR SID frame does appear, the system may compensate the speech and noise power level calculation. The rationale behind this compensation is that during the seven no data frames the frame energy has insignificant changes. Embodiments of DTX process 10 may use the previous saved speech power, noise power, and VAD flag to repeat the power measurement process seven times. Embodiments of DTX process 10 may include an Experience Intelligence (EXi) module that may be configured to provide accurate mean-opinion-score (MOS) values, based on ITU G.107 E-model, despite the fact that the VQA functions are not processing the 140 ms comfort noise.

In some embodiments, the same principle may apply to timing synchronization for AEC module. In the time-domain, the three buffers representing the long term reference signal energy, short term reference signal energy, and the VAD flag, may be compensated for the seven no data frames when the DTX SID frame does appear. In the frequency domain, the dB value of the latest signal energy based on each critical band may be stored in a buffer with array size 18 since there are totally 18 critical bands. DTX process 10 may compensate this buffer using a similar approach. The AEC timing may be synchronized by the above procedure during DTX where seven no data frames are not processed.

Figure 7:
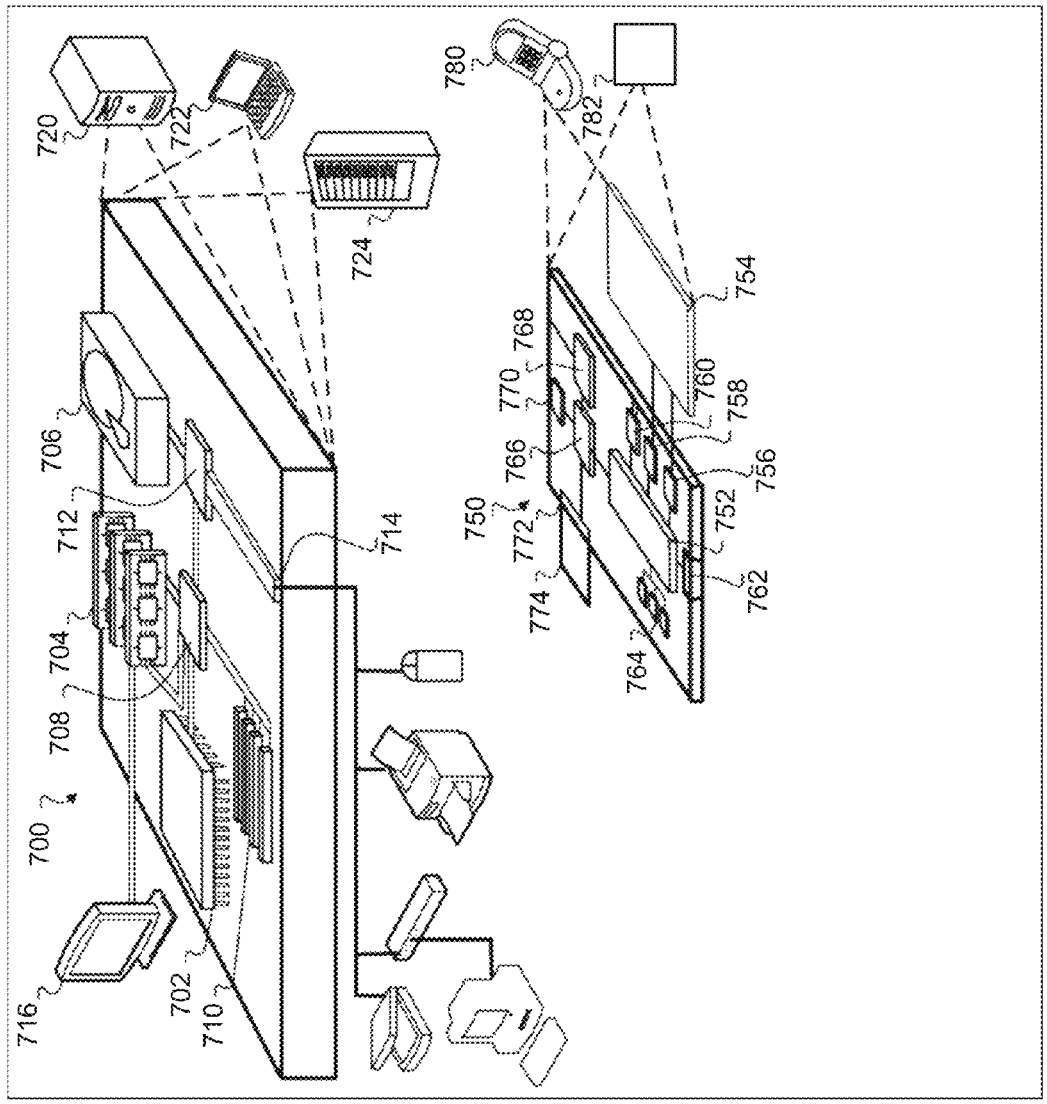
FIG. 7 shows an example of a computer device and a mobile computer device that can be used to implement embodiments of the present disclosure.

Referring now to FIG. 7, an example of a generic computer device 700 and a generic mobile computer device 750, which may be used with the techniques described herein is provided. Computing device 700 is intended to represent various forms of digital computers, such as tablet computers, laptops, desktops, workstations, personal digital assistants, servers, blade servers, mainframes, and other appropriate computers. In some embodiments, computing device 750 can include various forms of mobile devices, such as personal digital assistants, cellular telephones, smartphones, and other similar computing devices. Computing device 750 and/or computing device 700 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 700 may include processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, may be interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

Memory 704 may store information within the computing device 700. In one implementation, the memory 704 may be a volatile memory unit or units. In another implementation, the memory 704 may be a non-volatile memory unit or units. The memory 704 may also be another form of computer-readable medium, such as a magnetic or optical disk.

Storage device 706 may be capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

High speed controller 708 may manage bandwidth-intensive operations for the computing device 700, while the low speed controller 712 may manage lower bandwidth-intensive operations. Such allocation of functions is exemplary only. In one implementation, the high-speed controller 708 may be coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 may include a processor 752, memory 754, an input/output device such as a display 754, a communication interface 766, and a transceiver 768, among other components. The device 750 may also be provided with a storage device, such as a micro-drive or other device, to provide additional storage. Each of the components 750, 752, 754, 784, 766, and 768, may be interconnected using various buses, and several of the components may be mounted on a common motherboard or in other manners as appropriate.

Processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

In some embodiments, processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

In some embodiments, memory 764 may store information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

Computing device 750 may be implemented in a number of different forms, as shown in the figure. For example, it may be implemented as a cellular telephone 780. It may also be implemented as part of a smartphone 782, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider). Any examples of code provided in the present disclosure are provided merely by way of example and are only provided as one possible way in, which the teachings of the present disclosure may be implemented.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for addressing discontinuous transmission (DTX) in a network device comprising:
  receiving, at a computing device, an audio signal;
  generating at least one silence descriptor (SID) frame associated with the audio signal;
  generating at least one no data frame associated with the audio signal;
  initiating a speech decoder, voice enhancement, and speech encoder operation for the at least one SID frame during a DTX operation; and
  bypassing the speech decoder, voice enhancement, and speech encoder functions for the at least one no data frame.

2. The method of claim 1, further comprising:
  relaying a plurality of bits from a decoder associated with the network device to an adaptive encoder.

3. The method of claim 2, further comprising:
  relaying a receiver (RX) frame type from the decoder to a transmission (TX) frame type in the adaptive encoder.

4. The method of claim 1, further comprising:
  calculating a logarithmic frame energy based upon, at least in part, a current SID frame;
  updating a history memory buffer associated with the logarithmic frame energy using the current SID frame; and
  calculating an averaged logarithmic frame energy using the updated history memory buffer.

5. The method of claim 1, further comprising:
  defining a decoder voice activity detection (VAD) flag based upon, at least in part, a codec mode rate; and
  saving the VAD flag in an adaptive encoder memory.

6. The method of claim 1, further comprising:
  calculating a decoder excitation for the at least one SID frame based upon, at least in part, a fixed codebook input without including an adaptive codebook input.

7. The method of claim 1, further comprising:
  saving original encoded LP coefficients and LSP parameters in an adaptive encoder memory associated with the network device.

8. The method of claim 2, further comprising:
  copying the at least one SID frame from an RTP packet in the decoder to the output of the adaptive encoder.

9. The method of claim 8, further comprising:
  saving an adaptive encoder excitation to an encoder excitation to achieve excitation synchronization; and
  generating a new SID frame using one or more LPC parameters available in an adaptive encoder memory.

10. The method of claim 1,
  wherein bypassing includes completely ignoring the at least one no data frame.

11. A system for addressing discontinuous transmission (DTX) in a network device, the system including at least one processor configured to perform operations comprising:
  receiving, at a computing device, an audio signal;
  generating at least one silence descriptor (SID) frame associated with the audio signal;
  generating at least one no data frame associated with the audio signal;
  initiating a speech decoder, voice enhancement, and speech encoder operation for the at least one SID frame during a DTX operation; and
  bypassing the speech decoder, voice enhancement, and speech encoder functions for the at least one no data frame.

12. The system of claim 11, further comprising:
  relaying a plurality of bits from a decoder associated with the network device to an adaptive encoder.

13. The system of claim 12, further comprising:
  relaying a receiver (RX) frame type from the decoder to a transmission (TX) frame type in the adaptive encoder.

14. The system of claim 11, further comprising:
  calculating a logarithmic frame energy based upon, at least in part, a current SID frame;
  updating a history memory buffer associated with the logarithmic frame energy using the current SID frame; and
  calculating an averaged logarithmic frame energy using the updated history memory buffer.

15. The system of claim 11, further comprising:
  defining a decoder voice activity detection (VAD) flag based upon, at least in part, a codec mode rate; and
  saving the VAD flag in an adaptive encoder memory.

16. The system of claim 11, further comprising:
  calculating a decoder excitation for the at least one SID frame based upon, at least in part, a fixed codebook input without including an adaptive codebook input.

17. The system of claim 11, further comprising:
saving original encoded LP coefficients and LSP parameters in an adaptive encoder memory associated with the network device.

18. The system of claim 12, further comprising:
copying the at least one SID frame from an RTP packet in the decoder to the output of the adaptive encoder.

19. The system of claim 18, further comprising:
saving an adaptive encoder excitation to an encoder excitation to achieve excitation synchronization; and
generating a new SID frame using one or more LPC parameters available in an adaptive encoder memory.

20. The system of claim 11,
wherein bypassing includes completely ignoring the at least one no data frame.

* * * * *